Dec. 20, 1927.
A. L. DUNCAN
1,653,552
METHOD OF REMOVING THE PIT FROM AND BISECTING SINGLE STONE FRUIT
Filed Nov. 18, 1925  2 Sheets-Sheet 1
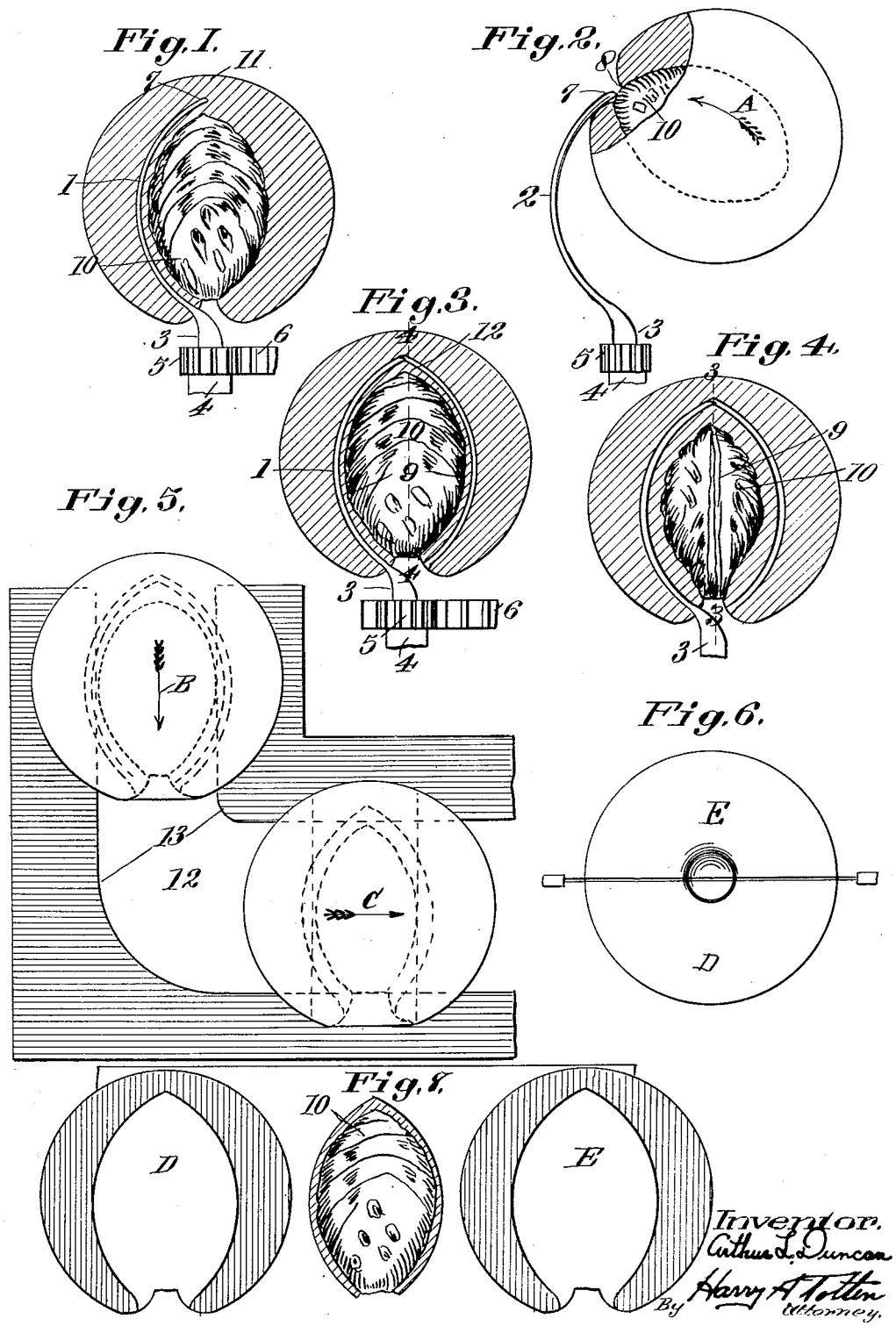

Dec. 20, 1927.  1,653,552
A. L. DUNCAN
METHOD OF REMOVING THE PIT FROM AND BISECTING SINGLE STONE FRUIT
Filed Nov. 18, 1925  2 Sheets-Sheet 2
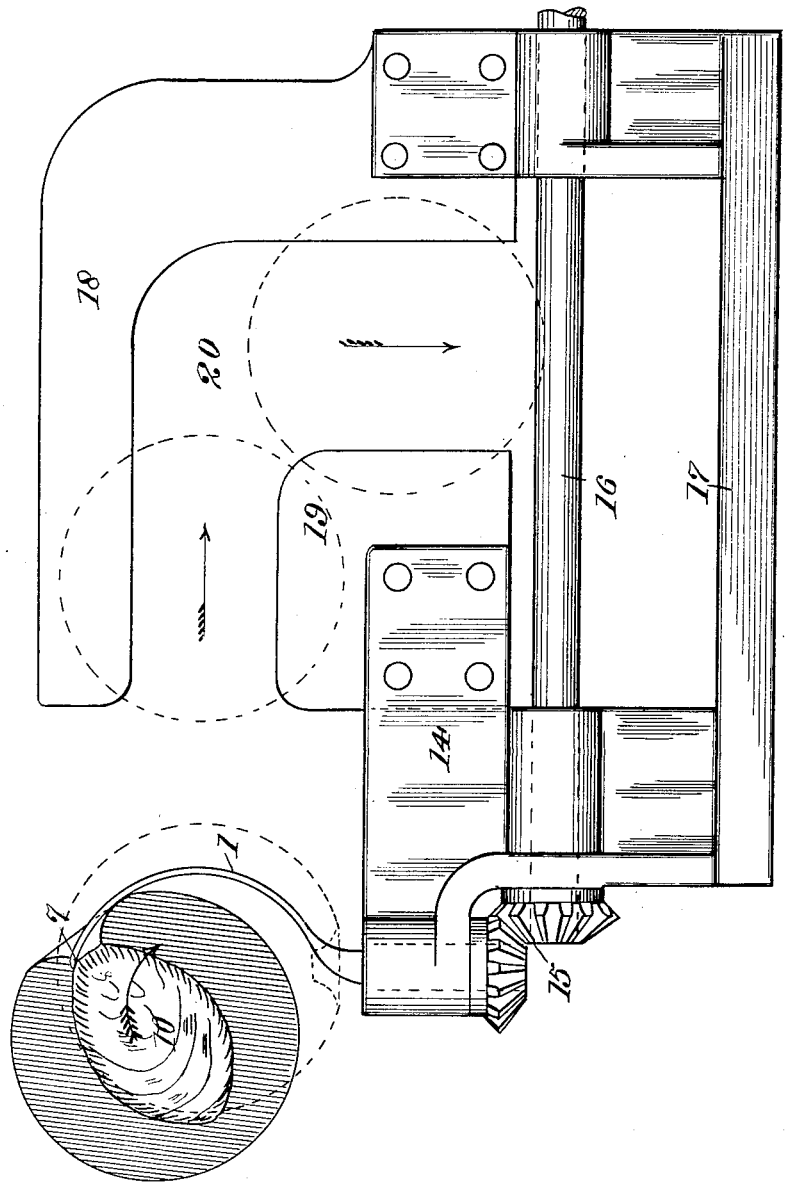
Inventor.
Arthur L. Duncan
By Harry N. Totten
Attorney.

Patented Dec. 20, 1927.

1,653,552

UNITED STATES PATENT OFFICE.

ARTHUR L. DUNCAN, OF OAKLAND, CALIFORNIA.

METHOD OF REMOVING THE PIT FROM AND BISECTING SINGLE-STONE FRUIT.

Application filed November 18, 1925. Serial No. 69,760.

This invention relates to the preparation of fruit, particularly peaches and other fruit of the single stone variety, for preservation.

The invention has for its objects to provide a new method for cutting the pit or stone from the fruit and thereafter bisecting or cutting the fruit into segments for the release of the cut pit from the interior thereof.

In carrying out my invention I prefer to insert a curved pitting knife endwise into the fruit from its stem end, with the contour of the inserted knife following the median line of the stone and its end falling short of extending through the blossom end of the fruit. When thus positioned, the impaled fruit or the pitting knife is operated or rotated on the axis of the pit to cut from the fruit an ellipsoidal portion from the center of the fruit, which portion contains the pit or stone.

The knife is then removed through the stem end of the fruit; the cut portion being precluded from being withdrawn from the fruit at this time due to the small diameter of the entrance opening. Thereafter the fruit is cut into sections, preferably halves, and such halving or cutting enables the ellipsoidal body containing the pit or stone to be released from the fruit.

In carrying out this invention, the stone or pit is cut from the fruit when the fruit is in whole condition, thus enabling the canner or operator to work on the fruit in its whole substantially spherical form, precluding ragged edges being formed in the half sections and insuring a uniform pit depression in each half section when the fruit is cut. In the cutting of the fruit, the operator makes the cut preferably in a plane parallel with the median line of the stone or pit rib.

In carrying out this invention, I have illustrated one form of apparatus but it is to be understood that any form of apparatus capable of carrying out the steps of the method may be employed.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

In the drawings disclosing the invention—

Figure 1 illustrates a curved pitting knife impaling a peach, the knife having been inserted into the fruit from the stem end, the knife following the contour of the median line of the stone rib.

Figure 2 illustrates the method of positioning the peach onto the knife, the removal of the peach from the knife being in a direction reverse to that illustrated by the arrow.

Figure 3 illustrates a peach having an enlarged section containing the pit cut from the center of the fruit.

Figure 4 is a view similar to Fig. 3, illustrating the rib on the peach pit.

Figure 5 is a view in diagrammatic elevation of a guide through which the peaches are passed, the walls of the guide halving the peach.

Figure 6 is a view of a peach after passing through the guide and prior to the separation of the halves.

Figure 7 is a view in plan of the separated halves illustrating the pit or stone removed therefrom.

Figure 8 is a view in side elevation of an apparatus with the pitting knife mounted in operative relation to the entrance end of the guide through which the peaches are caused to pass during the halving thereof.

Referring more particularly to the drawings—the numeral 1 indicates a conventional form of pitting knife longitudinally curved and provided either on one or its opposite longitudinal sides with cutting edges 2.

In the drawings, Figs. 1, 2 and 3, the shank of the knife 3 is mounted in a bearing 4 and is provided with a pinion 5 with which engages a rack 6.

The peach to be pitted is moved in an arcuate path in the direction of curvature of the blade 1, with the terminal or free end 7 of the pitting knife entering the stem end 8 of the fruit.

In moving the fruit from the position indicated in Fig. 2 to that in Fig. 1, the knife is caused to follow the contour of the median line of the rib 9 of the stone or pit 10 and when fully positioned the free end 7 of the pitting knife falls short of projecting through the blossom end 11 of the fruit.

With the fruit positioned as in Fig. 1, the knife 1 is preferably rotated about the pit, cutting from the interior of the fruit an ellipsoidal body. This body contains the stone or pit 10 and a relatively thin covering of fruit 12 adhering to the pit or stone 10. With the reverse movement to that indicated by the arrow A in Fig. 2, the fruit is removed from the knife and as thus removed contains within it the ellipsoidal body which cannot be removed from the interior of the fruit until the side wall is cut, affording an opening. This cutting is done in any suitable manner, preferably on a line parallel with the median line 9 of the stone rib, causing the fruit to separate into half sections and enabling the pit to drop therefrom.

In making this cut in the fruit body, I illustrate a guide 12, portions of the side walls of which are arranged at right angles to each other, and the opposing edges 13 of the side walls forming cutting knives, thus the fruit in its travel, indicated by the arrow B, is cut on a line parallel with the median line of the stone rib, and when travelling in the direction of the arrow C is cut at right angles to the first cut, enabling the separation of the halves D and E, Fig. 7, and the stone 10 with its thin film 12 being free to fall from the fruit half sections.

In Fig. 8 the knife 1 is carried in a bearing in the outer end of an angle bracket 14 and is operated through a pair of bevelled gears 15 from a shaft 16. The lower end of the angle bracket 14 is carried by a base 17 and from the rear end of this base extends upwardly the rectangular cutting knife 18, between which and the opposing cutting knife 19 is a rectangular channel 20 through which the operator passes the peach after removing the same from the knife 1, with its contained ellipsoidal body bearing the pit 10.

I claim:—

1. The method of preparing single stone fruit for preserving which consists in cutting the pulp symmetrically about the stone and forming a single opening in the fruit at its stem end, the diameter thereof being less than the greatest diameter of the severed stone, and then cutting the fruit into sections to release the stone therefrom.

2. The method of preparing single stone fruit for preserving which consists in first entering a severing means conforming approximately to substantially half the contour of the stone in the plane of its suture, then severing a body including the stone from the flesh of the fruit by causing the severing means to move around the stone and finally separating the fruit into sections to release said body.

3. The method of halving and pitting single stone fruit which consists in severing the stone from the fruit pulp by cutting the pulp relatively close to the stone in a path approximating a surface of revolution about an axis located substantially in the plane of the suture of the pit while maintaining the fruit halves unseparated until the stone is substantially free from the pulp, and then separating the fruit into halves to release the stone therefrom.

4. The method of halving and pitting single stone fruit which consists in severing the stone from the fruit pulp by cutting the pulp relatively close to the stone in a path approximating a surface of revolution about an axis extending substantially from the blossom end to the stem end of the fruit while maintaining the fruit halves unseparated until the stone is substantially free from the pulp, and then separating the fruit into halves to release the stone therefrom.

5. The method of halving and pitting a single stone fruit which consists in entering a severing means conforming approximately to substantially half the contour of the stone in the plane of its suture without separating the halves of the pulp, severing a body including the stone from the pulp of the fruit by causing the severing means to move around the stone and separating the fruit into sections to release said body.

In testimony whereof I have signed my name to this specification.

ARTHUR L. DUNCAN.